US010867031B2

(12) United States Patent
Hughes et al.

(10) Patent No.: US 10,867,031 B2
(45) Date of Patent: Dec. 15, 2020

(54) MARKING VALID RETURN TARGETS

(71) Applicant: Apple Inc., Cupertino, CA (US)

(72) Inventors: Gregory D. Hughes, San Francisco, CA (US); Conrado Blasco, Sunnyvale, CA (US); Gerard R. Williams, III, Los Altos, CA (US); Jacques Anthony Vidrine, San Francisco, CA (US); Jeffry E. Gonion, Campbell, CA (US); Timothy R. Paaske, Cupertino, CA (US); Tristan F. Schaap, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1120 days.

(21) Appl. No.: 14/807,609

(22) Filed: Jul. 23, 2015

(65) Prior Publication Data

US 2017/0024559 A1 Jan. 26, 2017

(51) Int. Cl.
*G06F 21/54* (2013.01)

(52) U.S. Cl.
CPC .................................. *G06F 21/54* (2013.01)

(58) Field of Classification Search
CPC ....................................................... G06F 21/54
USPC .......................................................... 726/22
See application file for complete search history.

(56) References Cited

U.S. PATENT DOCUMENTS

| 5,214,786 A | 5/1993 | Watanabe et al. |
| 5,287,309 A | 2/1994 | Kai |
| 5,822,575 A | 10/1998 | Tran |
| 5,845,323 A | 12/1998 | Roberts |
| 5,848,433 A | 12/1998 | Tran |
| 6,016,533 A | 1/2000 | Tran |
| 6,073,230 A | 6/2000 | Pickett et al. |
| 6,138,213 A | 10/2000 | McMinn |
| 6,167,488 A | 12/2000 | Koppala |

(Continued)

FOREIGN PATENT DOCUMENTS

EP    1513062 A1    3/2005

OTHER PUBLICATIONS

Mann, Uri, U.S. Appl. No. 13/095,400, entitled "Emulating a Dual-Stack Processor Architecture for Single-Stack Processors", filed Apr. 27, 2011, 43 pages.

(Continued)

*Primary Examiner* — Kambiz Zand
*Assistant Examiner* — Aubrey H Wyszynski
(74) *Attorney, Agent, or Firm* — Kowert Hood Munyon Rankin and Goetzel PC; Rory D. Rankin

(57) ABSTRACT

Systems, apparatuses, methods, and computer-readable mediums for preventing return oriented programming (ROP) attacks. A compiler may insert landing pads adjacent to valid return targets in an instruction sequence. When a return instruction is executed, the processor may treat the return as suspicious if the target of the return instruction does not have an adjacent landing pad. Additionally, each landing pad may be encoded with a color, and a colored launch pad may be inserted into the instruction stream next to each return instruction. When a return instruction is executed, the processor may determine if the target of the return has a landing pad with the same color as the launch pad of the return instruction. Return-target pairs with color mismatches may be treated as suspicious and the offending process may be killed.

20 Claims, 12 Drawing Sheets

(56) References Cited

U.S. PATENT DOCUMENTS

| | | | |
|---|---|---|---|
| 6,314,514 | B1 | 11/2001 | McDonald |
| 6,598,151 | B1 | 7/2003 | Laurenti et al. |
| 7,020,747 | B2 | 3/2006 | Paiss |
| 7,581,089 | B1 | 8/2009 | White |
| 8,910,124 | B1 * | 12/2014 | Bhansali ............ G06F 11/3466 717/127 |
| 2004/0019774 | A1 | 1/2004 | Fuchikami et al. |
| 2004/0055003 | A1 | 3/2004 | Sundaram et al. |
| 2004/0255146 | A1 | 12/2004 | Asher et al. |
| 2005/0050278 | A1 | 3/2005 | Meier et al. |
| 2006/0015855 | A1 * | 1/2006 | Kumamoto ............ G06F 8/443 717/136 |
| 2006/0174077 | A1 | 8/2006 | Abadi et al. |
| 2007/0285271 | A1 | 12/2007 | Erlingsson et al. |
| 2008/0022065 | A1 * | 1/2008 | Gutti .................... G06F 12/145 711/170 |
| 2012/0047322 | A1 * | 2/2012 | Chung .................. G06F 9/328 711/103 |
| 2012/0047579 | A1 * | 2/2012 | Ishiyama ............... G06F 21/52 726/23 |
| 2016/0179546 | A1 * | 6/2016 | Yamada ................ G06F 21/54 712/240 |
| 2016/0328560 | A1 * | 11/2016 | Momot ................ G06F 21/563 |

OTHER PUBLICATIONS

Powell, et al., "Reducing Set-Associative Cache Energy via Way-Prediction and Selective Direct-Mapping", Proceedings of the 34th Annual ACM/IEEE International Symposium on Microarchitecture, Dec. 1, 2001, pp. 54-65, IEEE Computer Society, Washington D.C., USA.

Waisman, Nico, "The so called Return Oriented Programming . . . ", Etica Nicomana, http://eticanicomana.blogspot.com/2010/06/so-called-return-oriented-programming.html, Jun. 2010, 7 pages.

Beakes, MP "High Performance Risc Processor", IBM TDB 12-89, Dec. 1, 1989, pp. 153-156.

* cited by examiner

MARKING VALID RETURN TARGETS

BACKGROUND

Technical Field

Embodiments described herein relate to the field of computing devices and more particularly, to preventing return oriented programming (ROP) attacks.

Description of the Related Art

Attempts to infiltrate computer systems, mobile devices, and other types of computing devices to gain unauthorized access to data, install malware, and cause damage are ever-present. In some cases, hackers may attempt to gain access to a computing device by employing a return oriented programming (ROP) exploit. Using a ROP exploit allows the hacker to utilize executable code that already exists in the memory of the device by jumping around to different instructions in a way that the code was not intended to be used. Often times, these jumps or branches can go undetected and the hacker can inflict damage or obtain sensitive data unbeknownst to the user.

ROP techniques allow attackers to execute code in the presence of security measures (e.g., data execution prevention, code signing). A successful ROP exploit can begin with an attacker gaining control over the stack and obtaining valid code pointers. The attacker can then manipulate a return address to jump to a sequence of instructions that ends with a return. With the attacker in control of the stack, the attacker is able to manipulate and determine which address to return to, allowing the attacker to string together a program by jumping to different code pointers?.

SUMMARY

Systems, apparatuses, methods, and computer readable mediums for preventing return oriented programming (ROP) exploits are contemplated.

In various embodiments, a variety of techniques may be utilized for ensuring programs only return to instructions that are valid return targets. In various embodiments, a processor may be configured to detect when a program has returned to an instruction that has not been deemed by a compiler to be a valid return target. In one embodiment, landing pads are inserted as markers in an instruction stream. The presence of a landing pad corresponding to an address indicates that it is legal to return to that address. All other returns are considered suspicious. In one embodiment, a combination of hardware and software may be utilized to detect suspicious returns and enforce a desired policy. In one embodiment, the desired policy may be to terminate the offending process.

In one embodiment, a complier may be configured to compile source code into machine executable code. The compiler may be configured to identify valid return targets in the code. For each valid return target found by the compiler, the compiler may insert a landing pad that corresponds to the valid return target. In one embodiment, the landing pad may be a nop instruction. When the compiled code is executed by a processor, the processor may be configured to determine whether a target of a return instruction has a corresponding landing pad. The processor may treat a return instruction that branches to an instruction without a corresponding landing pad as a suspicious return. In one embodiment, the host process may be terminated if a suspicious return is detected.

In some embodiments, the compiler may assign a color to each landing pad inserted into the instruction stream. The compiler may insert a launch pad in the instruction stream next to each return instruction. In one embodiment, the launch pad may be a nop instruction. The launch pad may be assigned a color which matches the color of a corresponding landing pad. In such an embodiment, if a return instruction is executed and the color of the launch pad does not match the color of the landing pad of the corresponding return target, the return instruction may be treated as a suspicious return and handled accordingly. In one embodiment, colors may be encoded using different register operands within a nop instruction.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
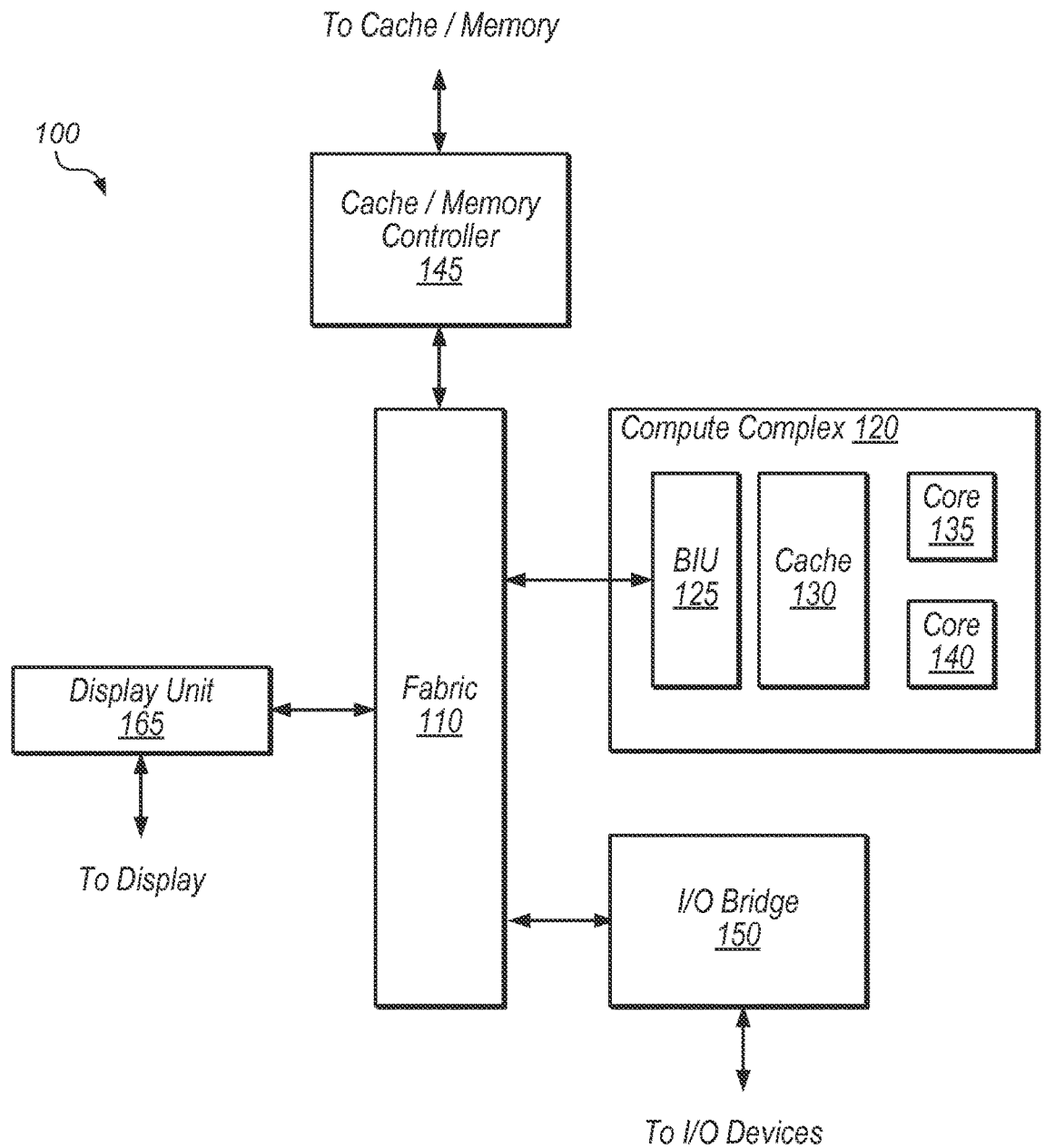
FIG. 1 is a block diagram illustrating one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a computing system 100 is shown. In some embodiments, some or all elements of the computing system 100 may be included within a system on a chip (SoC). In some embodiments, computing system 100 may be included in a mobile device. In the illustrated embodiment, the computing system 100 includes fabric 110, compute complex 120, input/output (I/O) bridge 150, cache/memory controller 145, and display unit 165. Fabric 110 may include various interconnects, buses, MUXes, controllers, etc., and may be configured to facilitate communication between various elements of computing system 100. In some embodiments, portions of fabric 110 are configured to implement various different communication protocols. In other embodiments, fabric 110 implements a single communication protocol and elements coupled to fabric 110 may convert from the single communication protocol to other communication protocols internally.

In the illustrated embodiment, compute complex 120 includes bus interface unit (BIU) 125, cache 130, and cores 135 and 140. In various embodiments, compute complex 120 may include various numbers of cores and/or caches. For example, compute complex 120 may include 1, 2, or 4 processor cores, or any other suitable number. Cores 135 and 140 may execute the main control software of system 100, such as an operating system. Generally, software executed by cores 135 and 140 during use may control the other components of the system to realize the desired functionality of the system. Cores 135 and 140 may also execute other software, such as application programs. The application programs may provide user functionality, and may rely on the operating system for lower level device control.

In an embodiment, cache 130 is a set associative L2 cache. In some embodiments, cores 135 and/or 140 include internal instruction and/or data caches. In some embodiments, a coherency unit (not shown) in fabric 110, cache 130, or elsewhere in computing system 100 may be configured to maintain coherency between various caches of computing system 100. BIU 125 may be configured to manage communication between compute complex 120 and other elements of computing system 100. Processor cores such as cores 135 and 140 may be configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

In one embodiment, display unit 165 may be configured to read data from a frame buffer and provide a stream of pixel values for display. Display unit 165 may be configured as a display pipeline in some embodiments. Additionally, display unit 165 may be configured to blend multiple frames to produce an output frame. Furthermore, display unit 165 may include one or more interfaces (e.g., MIPI® or embedded display port (eDP)) for coupling to a user display (e.g., a touchscreen or an external display)).

I/O bridge 150 may include various elements configured to implement various functionality, including universal serial bus (USB) communications, security, audio, and/or low-power always-on functionality, for example. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150.

Figure 2:
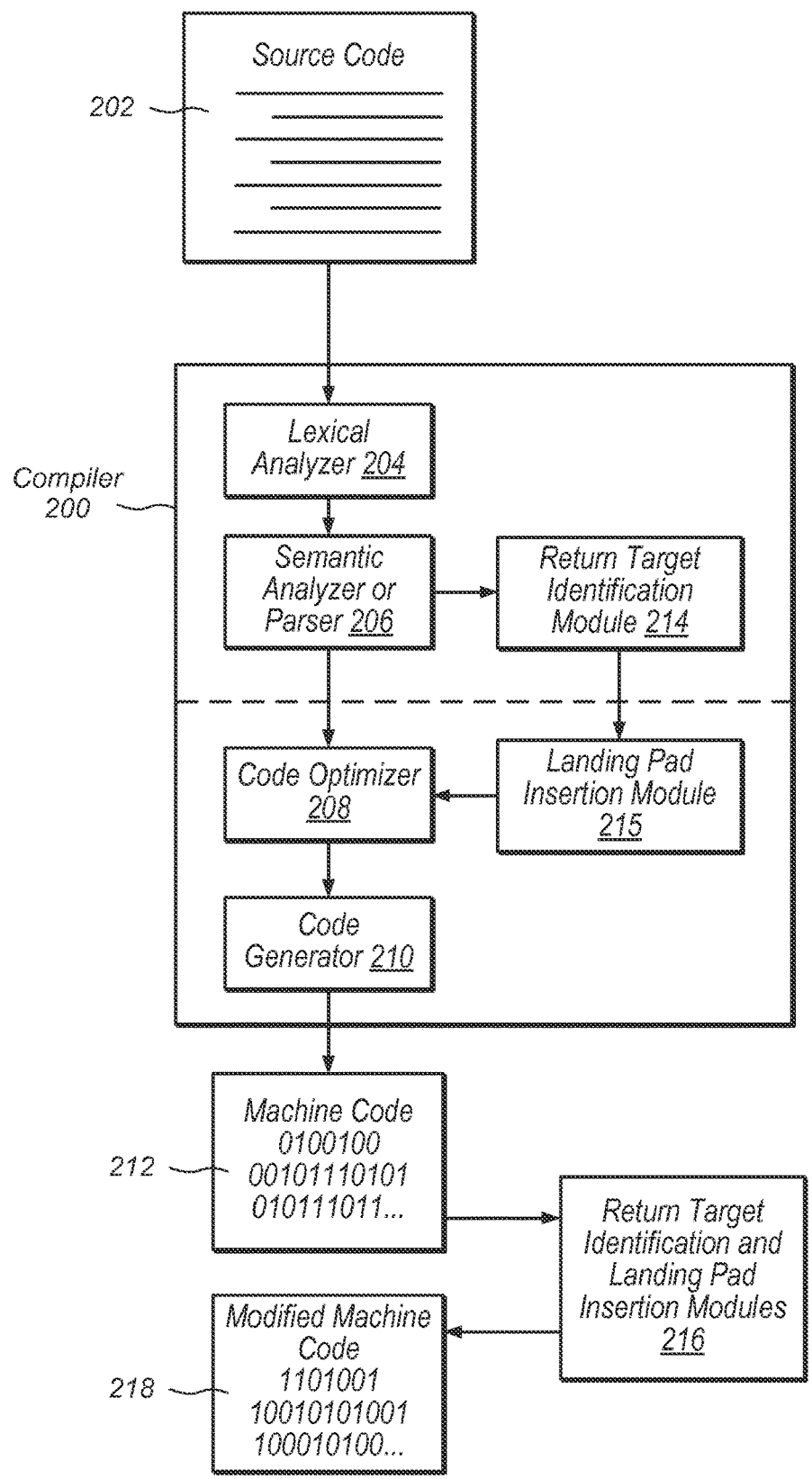
FIG. 2 is a block diagram of one embodiment of a compiler.

Turning now to FIG. 2, a block diagram of a compiler 200 is shown. The compiler 200 may be configured to convert human-readable source code 202 to object code which is understandable to and typically executable by one or more processors (e.g., cores 135 and 140 of FIG. 1). Compiler 200 may be configured to perform lexical analysis, preprocessing, parsing, semantic analysis, code optimization, and code generation, as well as other operations. Programmers typically write software using high level languages and use a compiler to convert those high level instructions to binary machine code.

The compiler 200 takes as input source code 202 for a computer program written in a programming language such as Objective-C, C, C++, Visual Basic, Java, and so forth. The compiler 200 passes the source code 202 to the front end of the compiler 200 which includes the lexical analyzer 204 and the semantic analyzer or parser 206. At this stage or at any other stage in the compiler 200, return target identification module 214 may identify valid return targets in the code and landing pad insertion module 215 may insert a landing pad adjacent to each identified return target. In other embodiments, the landing pad may be inserted in a location other than directly adjacent to the return target. The compiler 200 can include modules other than those shown in FIG. 2, can exclude some of the modules shown in FIG. 2, and can appear in different configurations. In some embodiments, compiler 200 may be a just-in-time (JIT) compiler that compiles code at run-time.

The front end produces an intermediate representation of the code which is passed to the back end of compiler 200. The division between the front end and back end of compiler 200 is shown with a dashed line. Often the division between the front end and the back end of a compiler is somewhat blurred. The back end of compiler 200 may include a code optimizer 208 and a code generator 210. Code generator 210 may be configured to produce machine code 212. It is noted that machine code 212 and 218 may also be referred to as object code (or a program's object code). A linker, not shown, can combine the output machine code 212 from several related compiled projects into a single executable file. In some embodiments, return target identification and landing pad insertion modules 216 separate from the compiler 200 can process the machine code 212 to produce modified machine code 218. In another embodiment, modules 214 and 215 in the compiler in combination with a post-compile tool including modules 216 may operate together to insert landing pads next to valid return targets. Other compiler components and modules can be added within the spirit and scope of this disclosure.

Figure 3:
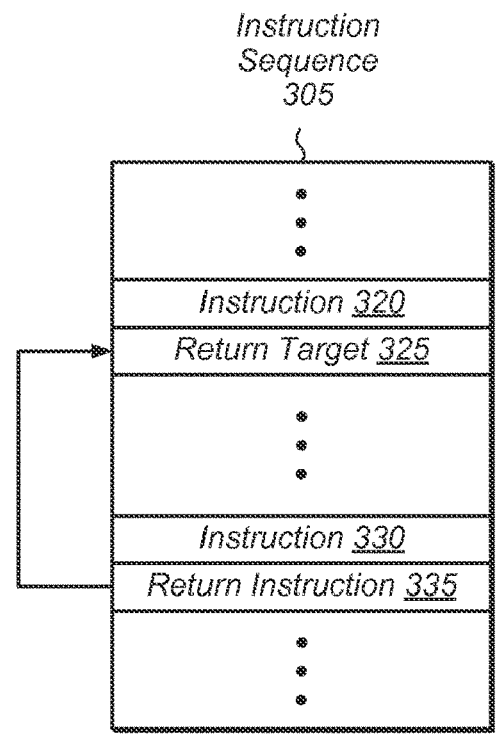
FIG. 3 illustrates examples of sample instruction sequences.
Figure 3:
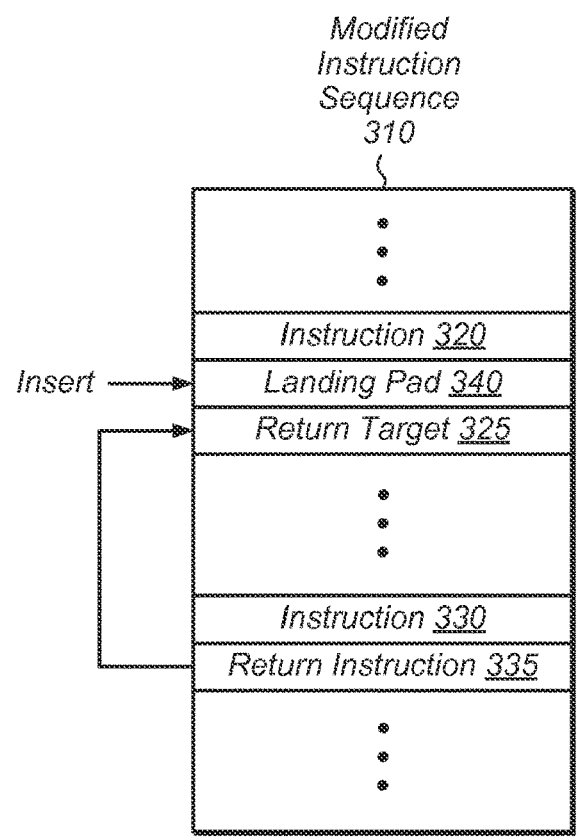

Referring now to FIG. 3, examples of sample instruction sequences 305 and 310 are shown. Instruction sequence 305 is representative of one example of an original instruction sequence prior to the insertion of a landing pad. Instruction sequence 305 includes instruction 320, return target 325, instruction 330, and return instruction 335. Instruction sequence 305 may also include any number of other instructions which are not shown in FIG. 3 to avoid cluttering the figure. A compiler (e.g., compiler 200 of FIG. 2) may be configured to identify valid return targets in instruction sequence 305. The compiler may begin this process by identifying return instructions in instructions sequence 305 and then determining the targets of these return instructions. For example, the compiler may identify return instruction 335 as a return instruction in instruction sequence 305, and then the compiler may determine that return instruction 335 will transfer program execution to return target 325.

In response to identifying return target 325 as the target of return instruction 330, the compiler may be configured to insert landing pad 340 adjacent to return target 325 as shown in modified instruction sequence 310. In one embodiment, landing pad 340 may be a nop instruction while in other embodiments, landing pad 340 may be other types of instructions. In one embodiment, the compiler may insert landing pad 340 immediately prior to return target 325 in modified instruction sequence 310. In another embodiment, the compiler may insert landing pad 340 immediately subsequent to return target 325 in modified instruction sequence 310. It should be understood that while a compiler may perform the above-described steps, in other embodiments, other tools or modules, such as a post-compile tool, may perform these steps. As used herein, a nop instruction, which may also be referred to as a noop instruction, is an instruction or command that does nothing (e.g., no operation).

When a processor of a computing system (e.g., system 100) executes modified instruction sequence 310, the processor may determine if there is a landing pad adjacent to return target 325 when executing return instruction 335. The presence of landing pad 340 next to return target 325 will indicate to the processor that it is safe to return to return target 325. On the other hand, if the processor executes a return instruction which returns to an instruction without an adjacent landing pad, the processor may treat the return instruction as suspicious and generate an exception or other fault. This may result in the offending process being terminated.

In other embodiments, other ways of marking valid return targets may be utilized other than inserting landing pads into the instruction stream. For example, in another embodiment, one or more bits may be reserved in the instruction set architecture (ISA) for every instruction to be able to mark any instruction as a valid return target. In a further embodiment, at program load time, a pre-assembled list of valid return sites may be loaded into hardware. Other techniques for marking valid return targets are possible and are contemplated.

Figure 4:
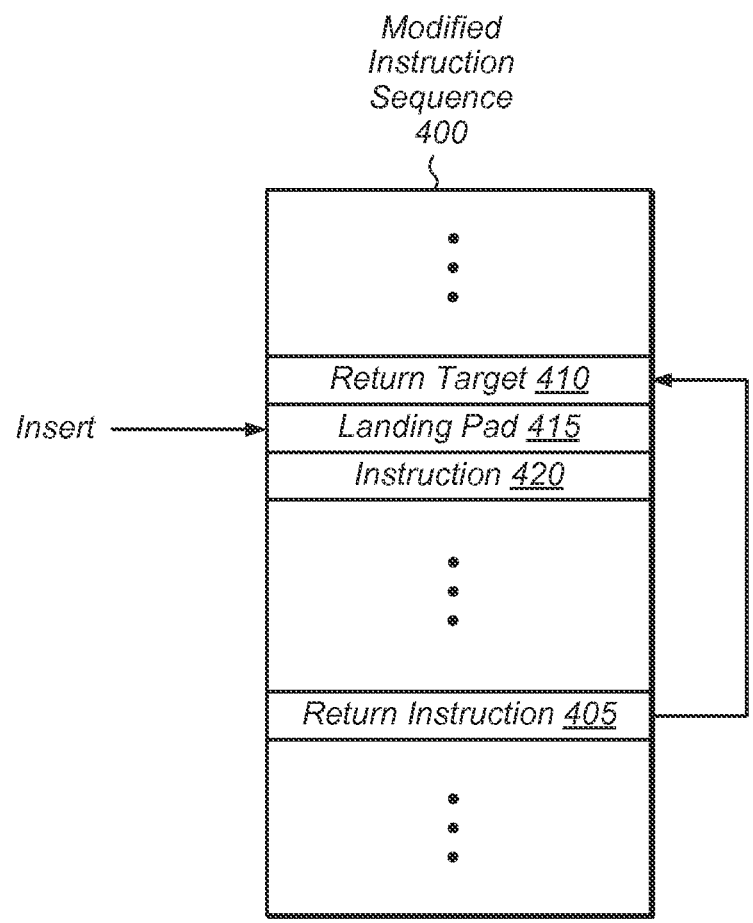
FIG. 4 illustrates another example of a modified instruction sequence.

Turning now to FIG. 4, another example of a modified instruction sequence 400 is shown. A compiler may identify return instruction 405 and its corresponding return target 410 and then insert landing pad 415 adjacent to return target 410. However, in contrast to modified instruction sequence 310 of FIG. 3, the compiler may insert landing pad 415 after return target 410. Instruction 420 represents an instruction which was immediately subsequent to return target 410 before the compiler inserted landing pad 415. Modified instruction sequence 400 is intended to illustrate the use of an alternate placement for the insertion of landing pads as compared to modified instruction sequence 310.

Figure 5:
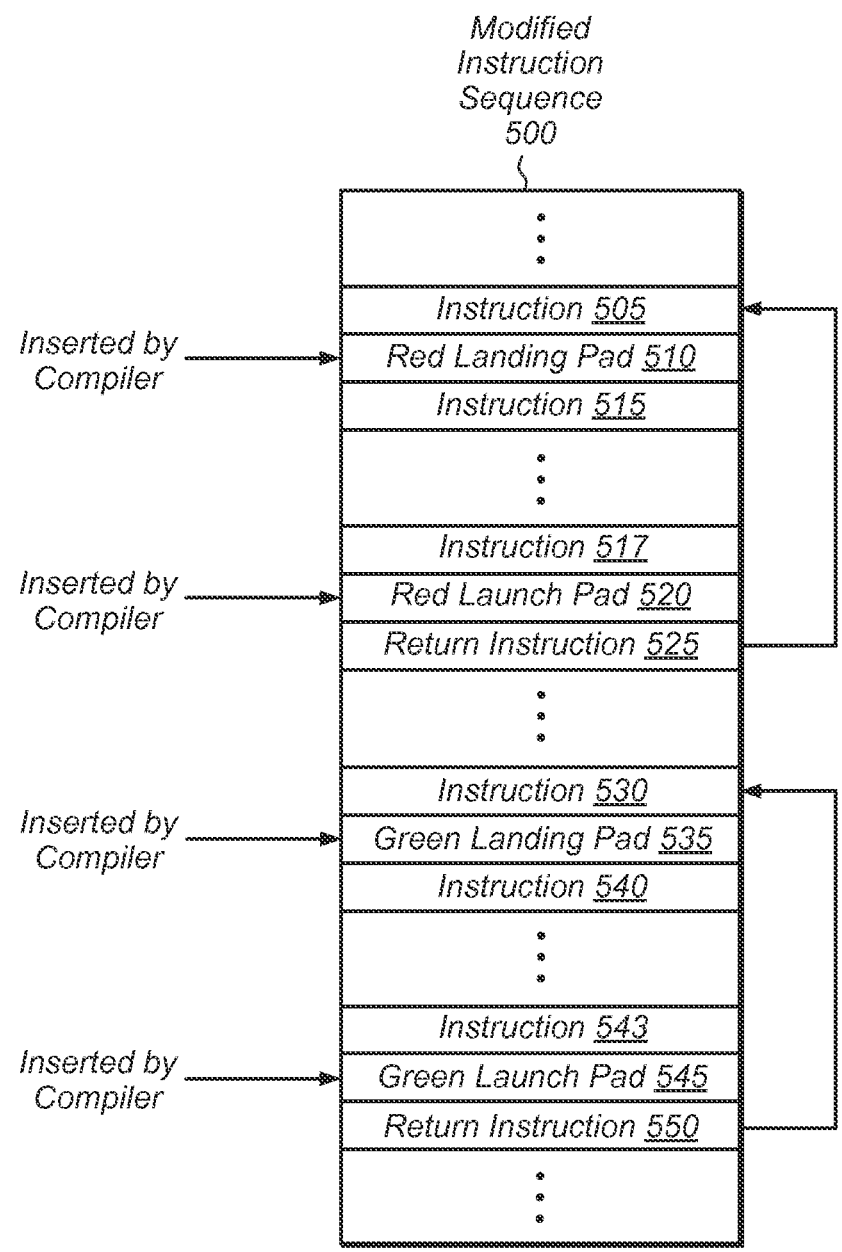
FIG. 5 illustrates another example of a modified instruction sequence.

Referring now to FIG. 5, another example of a modified instruction sequence 500 is shown. In one embodiment, a compiler may insert colored landing pads and colored launch pads into the instruction sequence adjacent to return targets and return instructions, respectively. As shown in modified instruction sequence 500, there are two return instructions 525 and 550. The compiler may identify the return instructions and then the compiler may determine the targets of these return instructions. As shown in modified instruction sequence 500, instruction 505 is the target of return instruction 525 and instruction 530 is the target of return instruction 550. In one embodiment, the compiler may insert a colored landing pad adjacent to a return target, wherein the color of the landing pad matches the color of a launch pad inserted adjacent to the corresponding return instruction. For example, the compiler may insert red landing pad 510 adjacent to instruction 505 and the compiler may insert red launch pad 520 adjacent to return instruction 525. When return instruction 525 is executed by a processor, the processor may determine whether the color of the launch pad corresponding to return instruction 525 matches the color of the landing pad corresponding to the target of return instruction 525. If an attacker attempts to modify the target of return instruction 525 to a different instruction without an adjacent red landing pad, the processor may detect that the return is suspicious. In one embodiment, the processor may kill the process in response to detecting the suspicious return.

In one embodiment, the compiler may insert red landing pad 510 subsequent to instruction 505 in modified instruction sequence 500 such that red landing pad 510 is placed in between instruction 505 and instruction 515. Alternatively, in another embodiment, the compiler may insert red landing pad 510 prior to instruction 505 in modified instruction sequence 500. In one embodiment, the compiler may insert red launch pad 520 prior to return instruction 525 in modified instruction sequence 500 such that red launch pad 520 is placed in between instruction 517 and return instruction 525. Alternatively, in another embodiment, the compiler may insert red launch pad 520 subsequent to return instruction 525 in modified instruction sequence 500.

Similarly, the compiler may insert green landing pad 535 subsequent to instruction 530 in modified instruction sequence 500 such that green landing pad 535 is placed in between instruction 530 and instruction 540. Also, the compiler may insert green launch pad 545 prior to return instruction 550 in modified instruction sequence 500 such that green launch pad 545 is placed in between instruction 543 and return instruction 550. By inserting green landing pad 535 subsequent to instruction 530, green landing pad 535 may be fetched and available in the processor pipeline to indicate that instruction 530 is a valid return target. Also, by inserting green launch pad 545 prior to return instruction 550, green launch pad 545 may be fetched and available in the processor pipeline prior to return instruction 550. In some processor pipelines, the instructions fetched subsequent to a return instruction may be discarded since program execution will move to another address after the return.

When the instructions of modified instruction sequence 500 are executed by a processor, the colored launch and landing pads may provide an extra layer of protection to prevent hackers from misappropriating the existing code and repurposing it for unintended purposes. For example, a hacker may take control of the stack and cause execution of the code to jump from return instruction 550 to instruction 505. However, this would be detected as a suspicious return since green launch pad 545 does not match the color of red landing pad 510.

Figure 6:
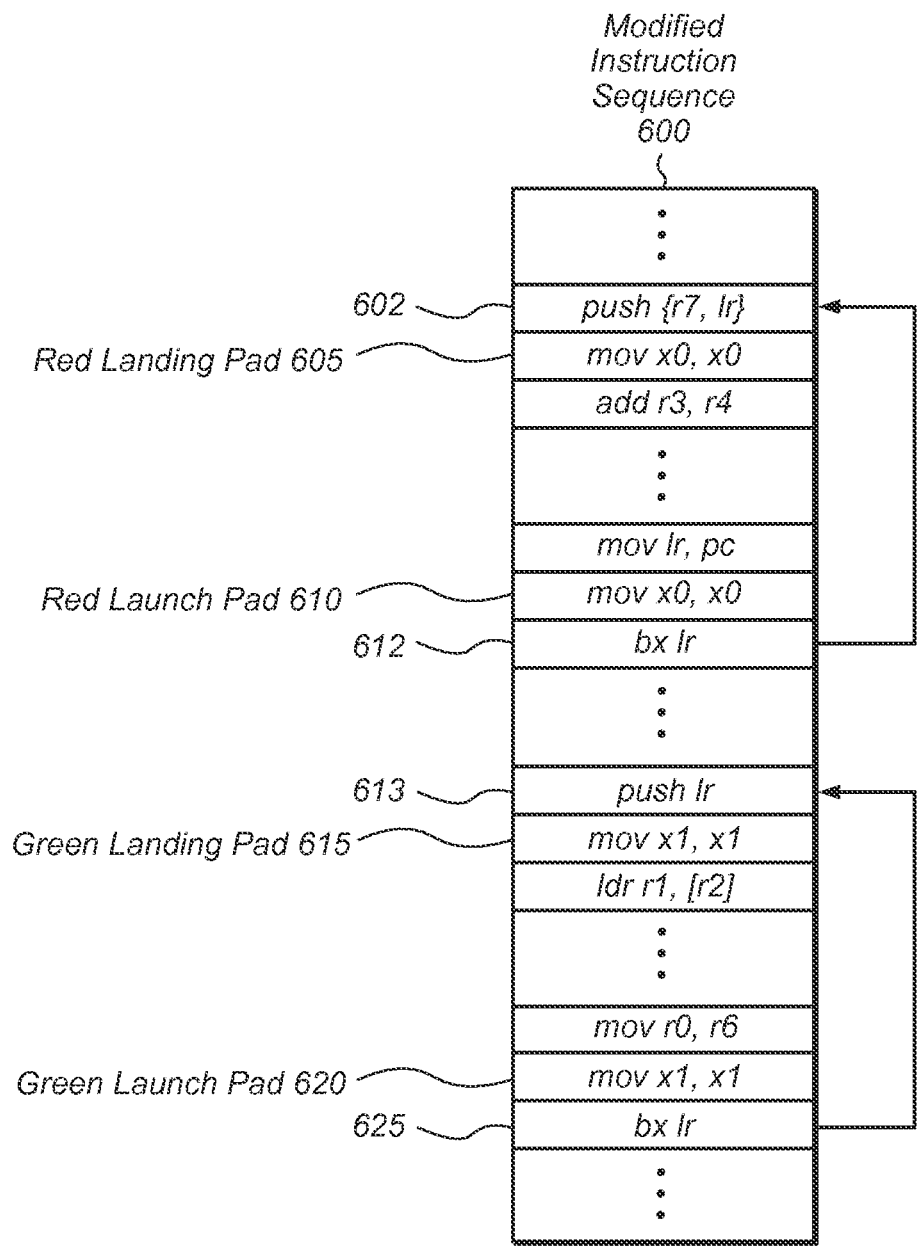
FIG. 6 illustrates another example of a modified instruction sequence.

Turning now to FIG. 6, another example of a modified instruction sequence 600 is shown. In the previous examples, instructions were labeled in a generic manner. Modified instruction sequence 600 is intended to illustrate one example with actual ARM® assembly code instructions in accordance with one embodiment. Other embodiments may utilize different instructions and may be implemented using any of various other ISAs. The purpose of modified instruction sequence 600 is to show one possible implementation scenario and is not intended to limit the scope of the techniques described herein.

A compiler may identify instruction 612 "bx lr" as a return instruction, and the compiler may determine that instruction 602 "push {r7, lr}" is the target of return instruction 612. Accordingly, the compiler may insert the red landing pad 605 "mov x0, x0" adjacent to instruction 602 and the red launch pad 610 "mov x0, x0" adjacent to return instruction 612. In this example, the "mov x0, x0" instruction is a nop instruction which does not change the state of the processor. It may be assumed for the purposes of this discussion that the register x0 is used to represent the color red. Additionally, the register x1 may be used to represent the color green, the register x2 may be used to represent the color yellow, and so on. Still further, the compiler may also identify instruction 625 "bx lr" as a return instruction, and the compiler may determine that instruction 613 "push lr" is the target of return instruction 625. Accordingly, the compiler may insert the green landing pad 615 "mov x1, x1" adjacent to instruction 613 and the green launch pad 620 "mov x1, x1" adjacent to return instruction 625.

In other embodiments, the compiler may be configured to identify other control transfer instructions (e.g., branch instructions, function calls) within the instruction sequence in addition to returns, and the compiler may determine the targets of these other control transfer instructions. Accordingly, the compiler may prevent other control transfer instructions from being used to jump to unintended targets by inserting a colored launch pad next to each control transfer instruction and a matching colored landing pad next to the target of each control transfer instruction.

In another embodiment, the register (e.g., x0, x1, x2) in the landing pad instruction may be used to encode the location of the target of the return instruction in relation to the landing pad instruction. For example, in one embodiment, the landing pad instruction "mov x0, x0" may indicate that the return target is immediately subsequent to the landing pad, the landing pad instruction "mov x1, x1" may indicate that the return target is immediately prior to the landing pad, the landing pad instruction "mov x2, x2" may indicate that the return target is subsequent to the landing pad by two instructions, and so on. By altering the location of the landing pad instruction in relation to the return target, the attacker will have a harder time finding valid code gadgets to use and/or mimicking legitimate code.

In other embodiments, other types of nop instructions may be utilized. For example, in another embodiment, a pair of instructions may be inserted as a landing pad, wherein the first instruction of the pair performs an operation and the second instruction of the pair reverses the operation. Other types of landing pad sequences are possible and are contemplated. In some embodiments, the type of landing pad instruction or sequence of instructions that are utilized may be programmable. The processor may load an indication of the type of landing pad encoding that is being used and then check for this during execution of a program. This approach can make it more difficult for an attacker to know in advance what type of protection is being used and hence make it harder for an attack to succeed.

Figure 7:
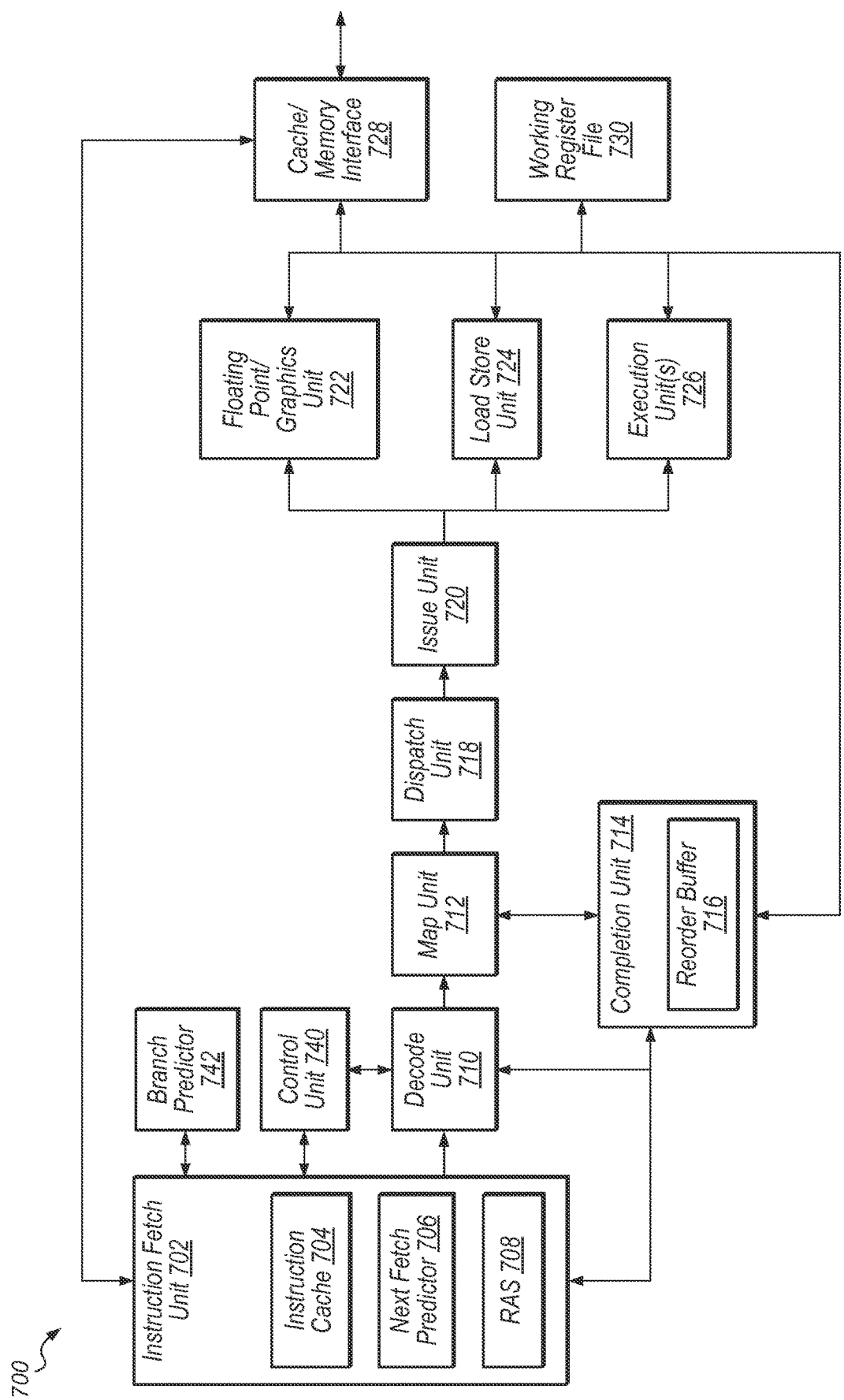
FIG. 7 is a block diagram illustrating one embodiment of a pipeline of a processor.

Referring now to FIG. 7, a block diagram illustrating one embodiment of a pipeline of processor 700 is shown. Processor 700 is one example of a processor core, and processor 700 may be utilized within a processor complex, such as compute complex 120 of FIG. 1. In one embodiment, each of cores 135 and 140 of FIG. 1 may include the components and functionality of processor 700. It is noted that processor 700 may include other components and interfaces not shown in FIG. 7. Processor 700 includes instruction fetch unit (IFU) 702 which includes an instruction cache 704, next fetch predictor 706, and return address stack (RAS) 708. IFU 702 may also include a number of data structures in addition to those shown, such as an instruction translation lookaside buffer (ITLB), instruction buffers, and/or other structures configured to store state that is relevant to thread selection and processing (in multi-threaded embodiments of processor 700).

IFU 702 is coupled to an instruction processing pipeline that begins with a decode unit 710 and proceeds in turn through a map unit 712, a dispatch unit 718, and issue unit 720. Issue unit 720 is coupled to issue instructions to any of a number of instruction execution resources including execution unit(s) 726, a load store unit (LSU) 724, and/or a floating-point/graphics unit (FGU) 722. These instruction execution resources are coupled to a working register file 730. Additionally, LSU 724 is coupled to cache/memory interface 728. Reorder buffer 716 is coupled to IFU 702, decode unit 710, working register file 730, and the outputs of any number of instruction execution resources. It is noted that the illustrated embodiment is merely one example of how processor 700 may be implemented. Alternative configurations and variations are possible and contemplated.

In one embodiment, IFU 702 may be configured to fetch instructions from instruction cache 704 and buffer them for downstream processing, request data from a cache or memory through cache/memory interface 728 in response to instruction cache misses, and predict the direction and target of control transfer instructions (e.g., branches, returns). Next fetch predictor 706 may be configured to generate a next fetch PC address at an early stage of the pipeline. The next fetch PC address generated by next fetch predictor 706 may be verified later in the pipeline by comparison to a prediction from branch predictor 742.

Main RAS 708 is a branch target prediction structure designed to predict subroutine return branches with high accuracy. Main RAS 708 may be a stack of return addresses using a last-in, first-out (LIFO) structure. Return addresses may be pushed onto main RAS 708 by subroutine call branches and return addresses may be popped off of main RAS 708 by subroutine return branches. The return address may be calculated as the next sequential PC address after the subroutine call branch address. Main RAS 708 may be located at an intermediate pipeline stage after the PC fetch address is generated but before retirement of instructions.

IFU 702 may convey fetched instruction data to decode unit 710. In one embodiment, decode unit 710 may be configured to prepare fetched instructions for further processing. Decode unit 710 may be configured to identify the particular nature of an instruction (e.g., as specified by its opcode) and to determine the source and destination registers encoded in an instruction, if any. Map unit 712 may be configured to map the decoded instructions (or uops) to physical registers within processor 700. Map unit 712 may also implement register renaming to map source register addresses from the uops to the source operand numbers identifying the renamed source registers. Dispatch unit 718 may be configured to dispatch uops to reservation stations (not shown) within the various execution units.

Issue unit 720 may be configured to provide instruction sources and data to the various execution units for picked (i.e., scheduled or dispatched) instructions. In one embodiment, issue unit 720 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, processor 700 includes a working register file 730 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 720 may proceed to one or more of the illustrated execution units to be performed. In one embodiment, each of execution unit(s) 726 is similarly or identically configured to perform certain integer-type instructions defined in the implemented ISA, such as arithmetic, logical, and shift instructions. In some embodiments, architectural and non-architectural register files are physically implemented within or near execution unit(s) 726. It is contemplated that in some embodiments, processor 700 may include any number of integer execution units, and the execution units may or may not be symmetric in functionality.

Load store unit (LSU) 724 may be configured to process data memory references, such as integer and floating-point load and store instructions and other types of memory reference instructions. LSU 724 may include a data cache (not shown) as well as logic configured to detect data cache misses and to responsively request data from a cache or memory through cache/memory interface 728. In one embodiment, a data cache in LSU 724 may be configured as a set-associative, write-through cache in which all stores are written to a higher-level (e.g., L2) cache regardless of whether they hit in the data cache.

In various embodiments, LSU 724 may implement a variety of structures configured to facilitate memory operations. For example, LSU 724 may implement a data TLB to cache virtual data address translations, as well as load and store buffers configured to store issued but not-yet-committed load and store instructions for the purposes of coherency snooping and dependency checking LSU 724 may include a miss buffer configured to store outstanding loads and stores that cannot yet complete, for example due to cache misses. In one embodiment, LSU 724 may implement a store queue configured to store address and data information for stores that have committed, in order to facilitate load dependency checking LSU 724 may also include hardware configured to support atomic load-store instructions, memory-related exception detection, and read and write access to special-purpose registers (e.g., control registers).

Floating-point/graphics unit (FGU) 722 may be configured to perform and provide results for certain floating-point and graphics-oriented instructions defined in the implemented ISA. For example, in one embodiment FGU 722 implements single- and double-precision floating-point arithmetic instructions compliant with the IEEE floating-point standards, such as add, subtract, multiply, divide, and certain transcendental functions.

In the illustrated embodiment, completion unit 714 includes reorder buffer (ROB) 716 and coordinates transfer of speculative results into the architectural state of processor 700. Entries in ROB 716 may be allocated in program order. Completion unit 714 may include other elements for handling completion/retirement of instructions and/or storing history including register values, etc. In some embodiments, speculative results of instructions may be stored in ROB 716 before being committed to the architectural state of processor 700, and confirmed results may be committed in program order. Entries in ROB 716 may be marked as completed when their results are allowed to be written to the architectural state. Completion unit 714 may also be configured to coordinate instruction flushing and/or replaying of instructions.

Various units of processor 700 may be configured to detect a suspicious return and trigger a response to the suspicious return. In one embodiment, branch predictor 742 may detect a branch misprediction and notify software, with software determining the cause of the misprediction. If the misprediction was caused by a suspicious return, an exception may be generated. In various embodiments, an exception may be an event that is processed by executing OS kernel code. The host system of processor 700 may then handle the exception in any of a variety of ways. For example, in one embodiment, in response to detecting a suspicious return instruction, the kernel may send a SIGKILL signal or SIGABRT to the offending process to cause the process to terminate immediately. In some embodiments, the kernel may only send a signal to cause the process to terminate if the process is a particular system daemon.

In another embodiment, processor 700 may include control unit 740 for detecting the execution of a suspicious return. A suspicious return may be a return instruction that returns to an instruction without an adjacent landing pad. A suspicious return may also be a return instruction that goes to an instruction with a landing pad of the wrong color. Control unit 740 may be configured to detect a return instruction and a corresponding target of the return instruction. Control unit 740 may also be configured to detect a launch pad and/or landing pad associated with the return and its target, respectively. If a landing pad is missing, or there is a color mismatch between the launch pad and landing pad, control unit 740 may be configured to generate an exception and notify the OS kernel of the suspicious return. Although control unit 740 is shown as a separate logical unit in FIG. 7, in some embodiments, control unit 740 may be incorporated within another unit (e.g., instruction fetch unit 702).

In one embodiment, processor 700 may specify a threshold of mispredicts (measured in CPU cycles) that must occur before an exception is generated. In various embodiments, the kernel may respond to the exception by inspecting the instruction stream to check for landing pads and/or color mismatches. If the appropriate landing pad instruction is missing or a color mismatch is detected, a ROP attack is assumed to be underway and the process may be killed. In other embodiments, other combinations of hardware and/or software may be utilized to detect a suspicious return using the techniques described herein.

Figure 8:
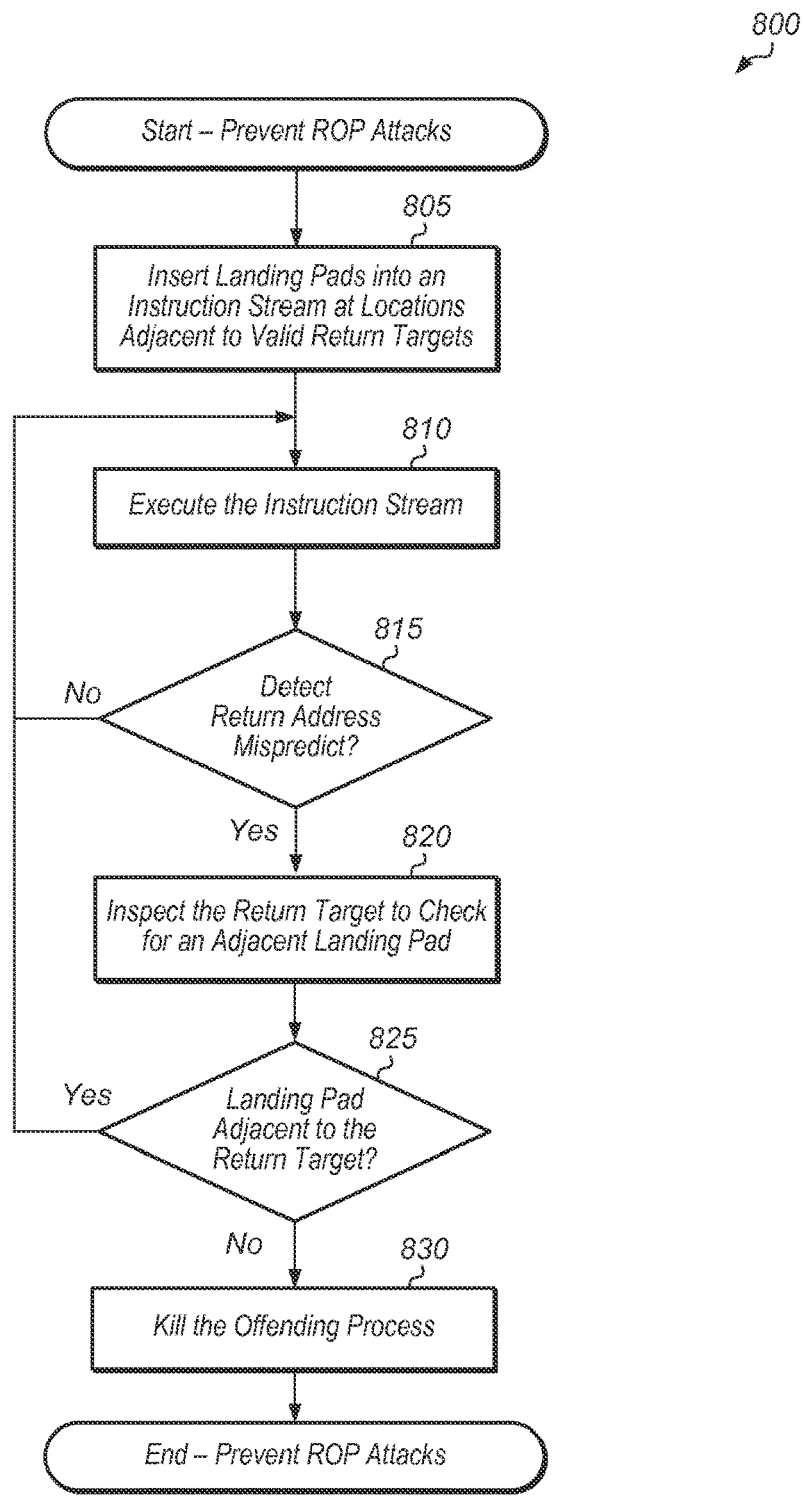
FIG. 8 is a generalized flow diagram illustrating one embodiment of a method for preventing ROP attacks.

Turning now to FIG. 8, one embodiment of a method 800 for preventing ROP attacks is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or devices described herein may be configured to implement method 800.

Landing pads may be inserted into an instruction stream at locations adjacent to valid return targets (block 805). In various embodiments, a compiler may be configured to insert the landing pads into the instruction stream. In one embodiment, a landing pad may be a nop instruction. Next, a processor may execute the instruction stream (block 810). In various embodiments, the processor may be included within a host device, wherein the host device is a smartphone, tablet, laptop computer, desktop computer, server, programmable consumer electronic device, set-top box, television, satellite receiver, or other electronic device or computing system. As the instruction stream is being executed, the processor may determine if a return address mispredict has occurred (conditional block 815). Alternatively, the processor may determine if a threshold number of mispredicts has occurred in conditional block 815.

If a return address mispredict has occurred (conditional block 815, "yes" leg), then the processor may inspect the return target to check for an adjacent landing pad (block 820). If a return address mispredict has not occurred (conditional block 815, "no" leg), then method 800 may return to block 810 with the processor continuing to execute the instruction stream. If there is a landing pad adjacent to the return target (conditional block 825, "yes" leg), then the target is valid and method 800 may return to block 810 with the processor continuing to execute the instruction stream. If there is not a landing pad adjacent to the instruction targeted by the return instruction (conditional block 825, "no" leg), then the processor may kill the offending process (block 830). After block 830, method 800 may end.

Figure 9:
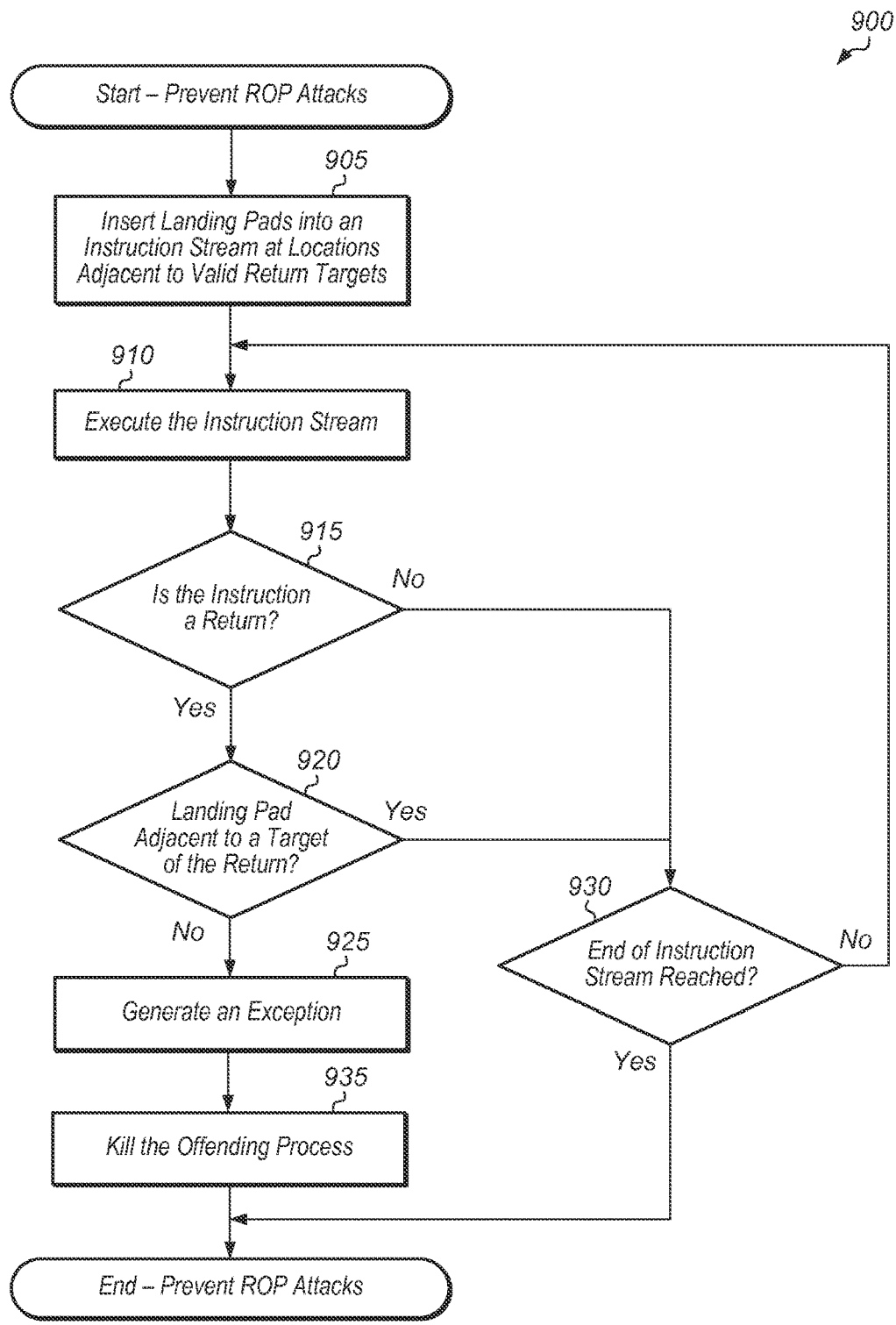
FIG. 9 is a generalized flow diagram illustrating another embodiment of a method for preventing ROP attacks.

Referring now to FIG. 9, another embodiment of a method 900 for preventing ROP attacks is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or devices described herein may be configured to implement method 900.

Landing pads may be inserted into an instruction stream at locations adjacent to valid return targets (block 905). In various embodiments, a compiler may be configured to insert the landing pads into the instruction stream. In one embodiment, a landing pad may be a nop instruction. Next, a processor may execute the instruction stream (block 910). In various embodiments, the processor may be included within a host device, wherein the host device is a smartphone, tablet, laptop computer, desktop computer, server, or other electronic device or computing system. As each instruction is executed, the processor may determine if the instruction is a return instruction (conditional block 915).

If the instruction being executed is a return instruction (conditional block 915, "yes" leg), then the processor may determine if there is a landing pad adjacent to the instruction targeted by the return instruction (conditional block 920). If the instruction being executed is not a return instruction (conditional block 915, "no" leg), then the processor may determine if the end of the instruction stream has been reached (conditional block 930). If there is a landing pad adjacent to the instruction targeted by the return instruction (conditional block 920, "yes" leg), then the target is valid and the processor may determine if the end of the instruction stream has been reached (conditional block 930). If there is not a landing pad adjacent to the instruction targeted by the return instruction (conditional block 920, "no" leg), then the processor may generate an exception (block 925).

In response to the processor generating an exception, the OS kernel may be configured to perform one or more actions, depending on the embodiment. In one embodiment, when the processor generates an exception, the OS kernel may kill the offending process (block 935). After block 935, method 900 may end. In other embodiments, the OS kernel may perform other actions in response to the processor generating an exception in block 925. If the end of the instruction stream has not been reached (conditional block 930, "no" leg), then method 900 may return to block 910 with the processor executing the next instruction in the instruction stream. If the end of the instruction stream has been reached (conditional block 930, "yes" leg), then method 900 may end.

Figure 10:
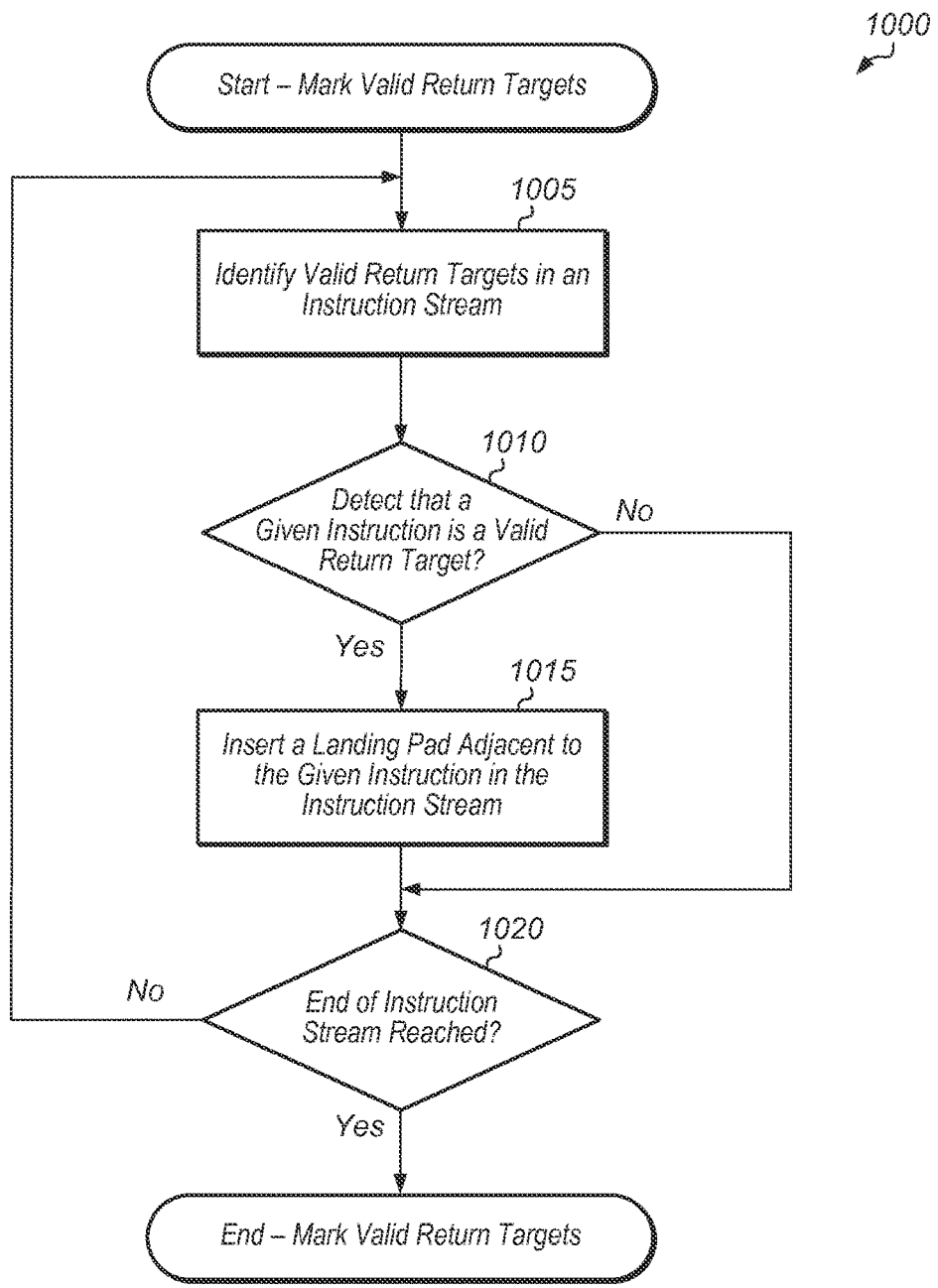
FIG. 10 is a generalized flow diagram illustrating one embodiment of a method for marking valid return targets.

Turning now to FIG. 10, one embodiment of a method 1000 for marking valid return targets is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or devices described herein may be configured to implement method 1000.

A compiler may identify valid return targets in an instruction stream (block 1005). If the compiler detects that a given instruction is a valid return target (conditional block 1010, "yes" leg), then the compiler may insert a landing pad adjacent to the given instruction in the instruction stream (block 1015). In one embodiment, the landing pad may be a nop instruction. If the compiler detects that a given instruction is a not valid return target (conditional block 1010, "no" leg), then the compiler may determine if the end of the instruction stream has been reached (conditional block 1020). If the end of the instruction stream has not been reached (conditional block 1020, "no" leg), then method 1000 may return to block 1005 with the compiler continuing to identify valid return targets in the instruction stream. If the end of the instruction stream has been reached (conditional block 1020, "yes" leg), then method 1000 may end. It should be understood that while method 1000 is described as being performed for return targets, in other embodiments, method 1000 may also be performed for the targets of other types of control transfer instructions (e.g., function calls, branches).

Figure 11:
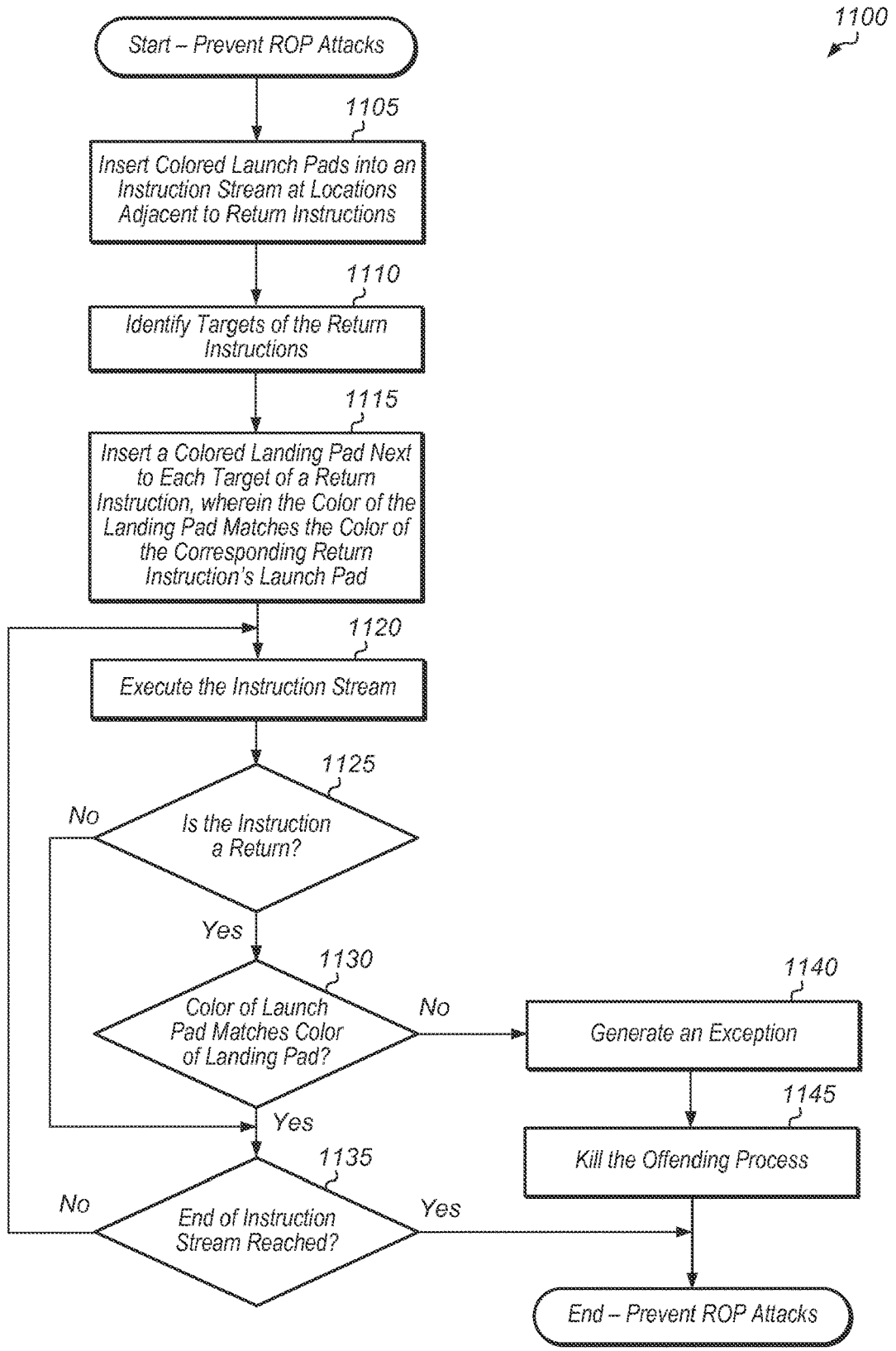
FIG. 11 is a generalized flow diagram illustrating another embodiment of a method for preventing ROP attacks.

Referring now to FIG. 11, another embodiment of a method 1100 for preventing ROP attacks is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or devices described herein may be configured to implement method 1100.

Colored launch pads may be inserted into an instruction stream at locations adjacent to return instructions (block 1105). For example, a red launch pad may be inserted into the instruction stream in a location adjacent to a first return instruction, a green launch pad may be inserted into the instruction stream in a location adjacent to a second return instruction, a yellow launch pad may be inserted into the instruction stream in a location adjacent to a third return instruction, and so on. In one embodiment, 'N' colors may be utilized, wherein 'N' is a positive integer, such that if there are more than 'N' return instructions, then some colors of launch pads will be used more than once in the instruction stream. In one embodiment, the color of a launch pad may be encoded using a particular register operand for a nop instruction. For example, a nop of "mov x0 x0" may represent the color red, a nop of "mov x1 x1" may represent the color green, a nop of "mov x2 x2" may represent the color yellow, and so on. In other embodiments, other techniques for encoding colors of launch pads may be utilized.

Next, targets of the return instructions may be identified (block 1110). Then, a colored landing pad may be inserted next to each target of a return instruction, wherein the color of the landing pad matches the color of the corresponding return instruction's launch pad (block 1115). Next, the processor may execute the instruction stream (block 1120). If the instruction is a return instruction (conditional block 1125, "yes" leg), then the processor may determine if the color of the landing pad adjacent to the target of the return instruction matches the color of the launch pad adjacent to the return instruction (conditional block 1130).

If the color of the landing pad adjacent to the target of the return instruction matches the color of the corresponding launch pad (conditional block 1130, "yes" leg), then the processor may determine if the end of the instruction stream has been reached (conditional block 1135). If the color of the landing pad adjacent to the target of the return instruction does not match the color of the corresponding launch pad (conditional block 1130, "no" leg), then the processor may generate an exception (block 1140). Alternatively, if the target of the return instruction does not have an adjacent landing pad in conditional block 1130, the processor may generate an exception. In response to the processor generating an exception, the OS kernel may kill the offending process (block 1145). After block 1145, method 1100 may end. In other embodiments, the OS kernel may perform other actions. If the end of the instruction stream has not been reached (conditional block 1135, "no" leg), then method 1100 may return to block 1120 with the processor executing the next instruction from the instruction stream. If the end of the instruction stream has been reached (conditional block 1135, "yes" leg), then method 1100 may end.

Figure 12:
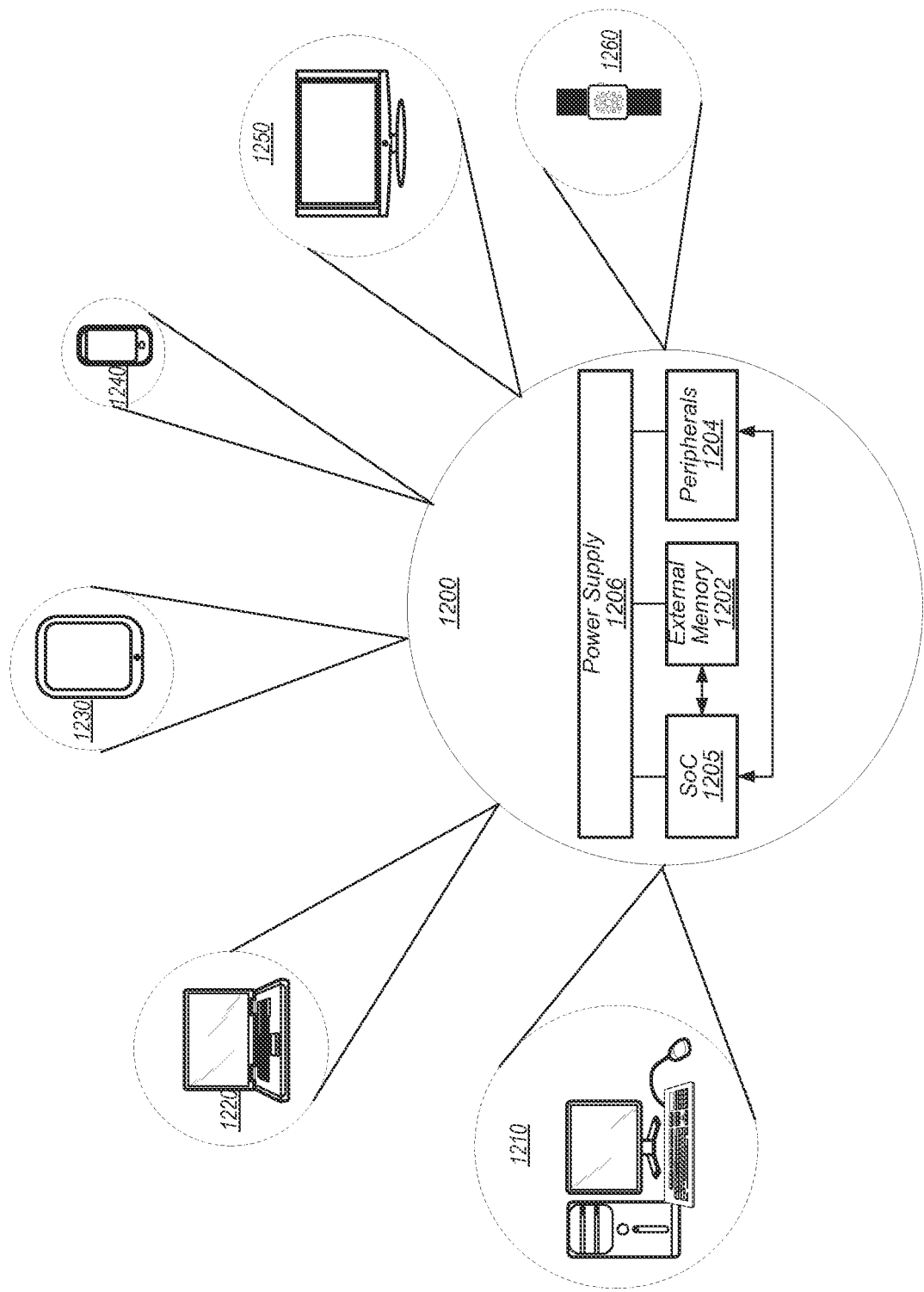
FIG. 12 is a block diagram of one embodiment of a system.

Referring next to FIG. 12, a block diagram of one embodiment of a system 1200 is shown. As shown, system 1200 may represent chip, circuitry, components, etc., of a desktop computer 1210, laptop computer 1220, tablet computer 1230, cell or mobile phone 1240, television 1250 (or set top box configured to be coupled to a television), wrist watch or other wearable item 1260, or otherwise. Other devices are possible and are contemplated. In the illustrated embodiment, the system 1200 includes at least one instance of system on chip (SoC) 1205 coupled to an external memory 1202. SoC 1205 may include various elements (e.g., compute complex 120) of system 100 of FIG. 1.

SoC 1205 is coupled to one or more peripherals 1204 and the external memory 1202. A power supply 1206 is also provided which supplies the supply voltages to SoC 1205 as well as one or more supply voltages to the memory 1202 and/or the peripherals 1204. In various embodiments, power supply 1206 may represent a battery (e.g., a rechargeable battery in a smart phone, laptop or tablet computer). In some embodiments, more than one instance of SoC 1205 may be included (and more than one external memory 1202 may be included as well).

The memory 1202 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 1205 in a chip-on-chip configuration, a package-on-package configuration, or a multi-chip module configuration.

The peripherals 1204 may include any desired circuitry, depending on the type of system 1200. For example, in one embodiment, peripherals 1204 may include devices for various types of wireless communication, such as wifi, Bluetooth, cellular, global positioning system, etc. The peripherals 1204 may also include additional storage, including RAM storage, solid state storage, or disk storage. The peripherals 1204 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
analyzing instructions of an instruction stream;
identifying a first instruction of said instructions as a valid return target, wherein identifying said first instruction as a valid return target comprises:
detecting a return instruction; and
determining the first instruction is a target of the return instruction; and
inserting a landing pad corresponding to the first instruction in the instruction stream, wherein the landing pad indicates that the first instruction is a valid return target.

2. The method as recited in claim 1, further comprising:
detecting execution of a return instruction; and
determining if a target of the return instruction has a corresponding landing pad.

3. The method as recited in claim 2, further comprising generating an exception responsive to determining the target of the return instruction does not have a corresponding landing pad.

4. The method as recited in claim 3, further comprising causing a corresponding process to terminate responsive to determining the target of the return instruction does not have a corresponding landing pad.

5. The method as recited in claim 2, wherein the landing pad is a nop instruction.

6. The method as recited in claim 5, wherein the nop instruction is inserted before the first instruction in the instruction stream.

7. The method as recited in claim 2, further comprising:
assigning a color to each landing pad inserted into the instruction stream;
inserting a colored launch pad into the instruction stream corresponding to each return instruction, wherein a color of a colored launch pad matches a color of a corresponding landing pad;
determining if a first color of a landing pad of a target of a given return instruction matches a second color of a launch pad of the given return instruction; and
generating an exception responsive to detecting a color mismatch between the first color and the second color.

8. A computing system comprising:
a memory; and
one or more processors configured to:
analyze instructions of an instruction stream;
identify a first instruction of said instructions as a valid return target, wherein to identify said first instruction as a valid return target, the processor is configured to:
detect a return instruction; and
determine the first instruction is a target of the return instruction; and
insert a landing pad corresponding to the first instruction in the instruction stream, wherein the landing pad indicates that the first instruction is a valid return target.

9. The computing system as recited in claim 8, wherein the one or more processors are further configured to:
detect a return instruction being executed; and
determine if a target of the return instruction has a corresponding landing pad.

10. The computing system as recited in claim 9, wherein the one or more processors are configured to generate an exception responsive to determining the target of the return instruction does not have a corresponding landing pad.

11. The computing system as recited in claim 10, wherein the one or more processors are further configured to cause a corresponding process to terminate responsive to determining the target of the return instruction does not have a corresponding landing pad.

12. The computing system as recited in claim 9, wherein the landing pad is a nop instruction.

13. The computing system as recited in claim 12, wherein the nop instruction is inserted before the first instruction in the instruction stream.

14. The computing system as recited in claim 9, wherein the one or more processors are further configured to:
assign a color to each landing pad inserted into the instruction stream;
insert a colored launch pad into the instruction stream adjacent to each return instruction, wherein a color of a colored launch pad matches a color of a corresponding landing pad;
determine if a first color of a landing pad of a target of a given return instruction matches a second color of a launch pad of the given return instruction; and
generate an exception responsive to detecting a color mismatch between the first color and the second color.

15. A non-transitory computer readable medium storing program instructions for execution by one or more processors, wherein the program instructions are executable by the one or more processors to:
analyze instructions of an instruction stream;
identify a first instruction of said instructions as a valid return target, wherein identifying said first instruction as a valid return target comprises:
detecting a return instruction; and
determining the first instruction is a target of the return instruction; and
modify the instruction stream by inserting a landing pad corresponding to the first instruction in the instruction stream, wherein the landing pad indicates that the first instruction is a valid return target.

16. The non-transitory computer readable medium as recited in claim 15, wherein the program instructions are executable to:
detect a return instruction being executed; and
determine if a target of the return instruction has an adjacent landing pad.

17. The non-transitory computer readable medium as recited in claim 16, wherein the program instructions are executable to generate an exception responsive to determining the target of the return instruction does not have an adjacent landing pad.

18. The non-transitory computer readable medium as recited in claim 17, wherein the program instructions are executable to cause a corresponding process to terminate responsive to determining the target of the return instruction does not have an adjacent landing pad.

19. The non-transitory computer readable medium as recited in claim 16, wherein the landing pad is a nop instruction.

20. The non-transitory computer readable medium as recited in claim 16, wherein the program instructions are executable to:
- assign a color to each landing pad inserted into the instruction stream;
- insert a colored launch pad into the instruction stream adjacent to each return instruction, wherein a color of a colored launch pad matches a color of a corresponding landing pad;
- determine if a first color of a landing pad of a target of a given return instruction matches a second color of a launch pad of the given return instruction; and
- generate an exception responsive to detecting a color mismatch between the first color and the second color.

* * * * *